(12) United States Patent
Lungu

(10) Patent No.: US 6,262,510 B1
(45) Date of Patent: Jul. 17, 2001

(54) ELECTRONICALLY SWITCHED RELUCTANCE MOTOR

(76) Inventor: Iancu Lungu, Str. Trapezului 5-1A, ap. 40, R-74381 Bukarest 3 (RO)

(*) Notice: Subject to any disclaimer, the term of this patent is extended or adjusted under 35 U.S.C. 154(b) by 0 days.

(21) Appl. No.: 08/809,238

(22) PCT Filed: Sep. 15, 1995

(86) PCT No.: PCT/RO95/00012

§ 371 Date: Nov. 10, 1998

§ 102(e) Date: Nov. 10, 1998

(87) PCT Pub. No.: WO96/09683

PCT Pub. Date: Mar. 28, 1996

(30) Foreign Application Priority Data

Sep. 22, 1994 (RO) .................................................. 94-01551
Apr. 25, 1995 (RO) .................................................. 95-00800

(51) Int. Cl.$^7$ .......................... H02K 19/10; H02K 29/08; H02K 7/14
(52) U.S. Cl. ........................ 310/254; 310/166; 310/68 B; 318/701
(58) Field of Search .................................... 310/166, 168, 310/254, 68 B, 216, 218, 214; 318/701, 254

(56) References Cited

U.S. PATENT DOCUMENTS

| 2,109,992 | 3/1938 | French ................................... 29/597 |
| 4,644,207 | 2/1987 | Catterfeld et al. .................... 310/126 |
| 5,214,365 | 5/1993 | Bahn ..................................... 318/701 |
| 5,365,137 | 11/1994 | Richardson et al. ................. 310/258 |

FOREIGN PATENT DOCUMENTS

| 431 701 | 8/1967 | (CH) . |
| 3138323A1 | 4/1983 | (DE) . |
| 0422226A1 | 4/1991 | (EP) . |
| 0441970A1 | 8/1991 | (EP) . |
| 0455 578 A2 | 11/1991 | (EP) . |
| 0469263A2 | 5/1992 | (EP) . |
| 0500963A1 | 9/1992 | (EP) . |
| 0506408A2 | 9/1992 | (EP) . |
| 0866547A1 | 9/1998 | (EP) . |
| 2028228 | 10/1970 | (FR) . |
| 2630868 | 11/1989 | (FR) . |
| 1198526 | 7/1970 | (GB) . |
| 2266196A | 10/1993 | (GB) . |
| 61-11052 | * 1/1988 | (JP) . |
| 48394 | 6/1965 | (LU) . |
| PCT/US89/04299 | 10/1989 | (WO) . |

OTHER PUBLICATIONS

Patent Abstracts of Japan, vol. 011, No. 092 (E–491), Mar. 24, 1987 & JP 61 244260 A (Hideyo Hirai), Oct. 30, 1986.
Le–Huy H. et al.: "A Novel Unipolar Converter for Switched Reluctance Motor" Jun. 26, 1989, Proceedings of the Annual Power Electronics Specialists Conference (PESC), Milwaukee, Jun. 26–29, 1989, vol. 1, NR. Conf. 20, pp. 30–10.

(List continued on next page.)

Primary Examiner—Karl Tamai
(74) Attorney, Agent, or Firm—Kelly Bauersfeld Lowry & Kelley, LLP

(57) ABSTRACT

This motor has a special magnetic circuit which enables it to be powered by a very simple electronic circuitry. This motor has, according to the figure, four U-shaped Yokes (11, 112) with eight unevenly spaced poles (111) surrounding a rotating six-pole rotor (12). The motor is driven by two power semiconductor devices (21) controlled from a Hall sensor (31). The demagnetising energy being set free by switching off the main windings (112X) will be directed through the coupling diodes (22) as premagnetising energy to the secondary windings (113Y) of the following phase (Y). This motor with high speed capability which is inexpensive, simple and quietly running can be mainly used for pumps, fans and blowers for gases and fluids.

29 Claims, 3 Drawing Sheets

OTHER PUBLICATIONS

International Search Report dated Jul. 31, 1998; Appln. No. 98108754.7–2207; Applicant: Iancu Lungu.

International Search Report dated Sep. 7, 1998; Appln. No. 98108755.4–2207–; Applicant: Iancu Lungu.

Three Abstracts entitled: Motor, Manufacture of Rotor for Motor, and Manufacture of Rotor for Motor; Nos. 59–204451; 59–204452, and 59–204453; dated: Nov. 19, 1984; p. 161 E 304.

Three Abstracts entitled: Permanent Magnet Type Motor, Stator for Magnet DC Machine, and Two–Phase Reluctance–Type Semiconductor Motor; Nos. 63–11050 (A), 63–11051 (A), and 63–11052 (A); dated: Jan. 18, 1988; p. 159 E 623.

Three Abstracts entitled: Rotor for Permanent Magnet Motor, Capstan Motor, and Starter Motor; Nos. 5–308746 (A), 5–308747 (A), and 5–308748 (A); dated: Nov. 19, 1993; p. 131 E 1514.

"Torque Control fo the Doubly–Salient Reluctance Motor", from ETEP, vol. 3, No. 4, Jul./Aug. 1993, Berlin, DE, pp. 265–272.

* cited by examiner

ELECTRONICALLY SWITCHED RELUCTANCE MOTOR

The invention relates to a novel type of d.c. motor comprising wound magnetic yokes, wherein the rotating field driving the motor is effected by the electronic commutation of the windings of the magnetic yokes.

In contrast to the vast majority of electronically switched motor, the motor according to the invention requires no permanent magnets in order to generate a useful torque and, for that reason, is more inexpensive to manufacture than the normal motors of this type.

Such a motor is e.g. known from the prospectus of Messrs. TASC DRIVES LTD., United Kingdom. This motor possesses 8 stator poles and a six-pole rotor revolving in the interior of the stator. The magnetic flux which excites the rotor, proceeds via two oppositely Located poles and passes half of the stator circumference as well as the diameter of the rotor; it thus passes in considerable Length non-wound iron yokes, which merely cause Losses.

Figure 1:
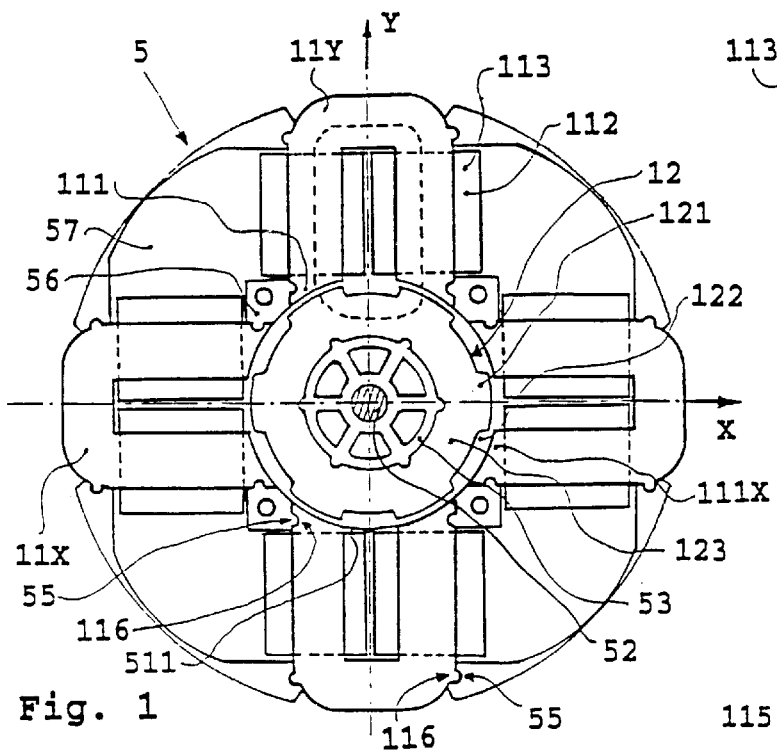

The DOS 2953032/79, FIG.1, shows a motor type possessing three wound stator yokes which are insulated from each other. Since the stator yokes are Located so as to be disposed at 120°, thus not oppositely disposed, strong radial forces act upon the rotor which result in a premature wear of the bearings.

The technical problem of the invention is to show several possibilities of how to construct some types of electronically switched motors and to offer generally applicable solutions both with regard to the magnetic circuit as well as regarding the commutation circuits with the object of obtaining inexpensive, light-weight motors subject to low losses.

The solution of the technical problem is achieved by means of the teaching of the main claim, while the constructional details are illustrated in the independent claims or in the drawings.

Below some general theoretical considerations:

The electronically switched reluctance motors according to the invention were for a long time considered to be inferior to the motors which are excited by means of permanent magnets because the magnetization energy of the poles does not come from permanent magnets, but every time the electromagnetic poles are to attract the rotor poles, this energy has to be supplied in an electrical manner. According to the teaching of the invention, this energy is cyclically recovered and transferred to the functionally following yoke because the self-inductance voltage Ua, which comes from the demagnetization energy of a yoke 11Y, is transmitted in the form of premagnetization energy to the following yoke 11X. On account of this, a saving in energy (a high degree of effectiveness) as well as a faster rise in the magnetic flux in these yokes is achieved which are approached by rotor poles moving away from the poles which have just been switched off.

Figure 2:
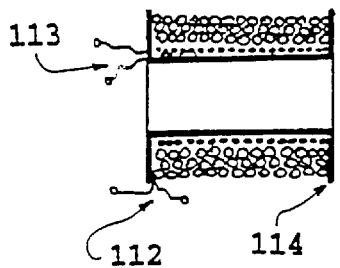
Figure 3:
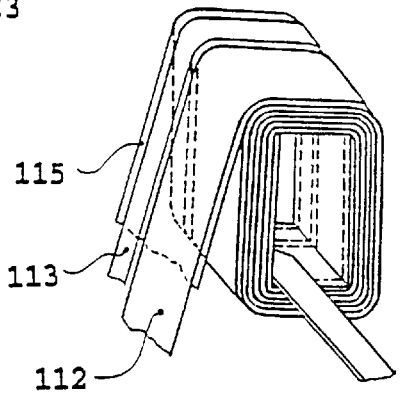
Figure 4:
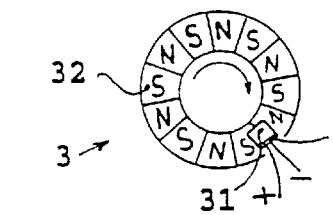

In order to provide a better understanding of the invention, a numbering system of the reference numbers of the drawings is defined here, wherein the initial figures of the reference number indicates the subgroup to which the designated object belongs: this is done as detailed in the following:

The parts of the electromotive circuit (which produces the useful torque) begin with the FIG. 1;

The parts of the electrical control circuit of the motor windings begin with the FIG. 2;

The parts of the circuit which serve to detect the position of the rotor poles relative to the poles of the electromagnetic excitation circuit, begin with the figure 3;

The parts of the magnetic circuit which the rotor moves into a starting position (not available in all variants), begin with the FIG. 4.

Figure 5:
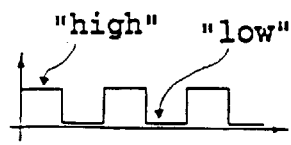
Figure 5B:
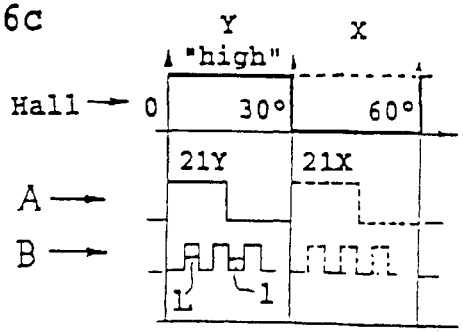

The logic output from the Hall sensor is shown in FIGS. 5a and 5b.

The motor control circuits are shown in FIGS. 6a–6e.

Figure 7:
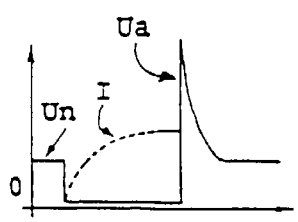

The voltage between the control transistors and the windings is shown in FIG. 7.

Figure 8:
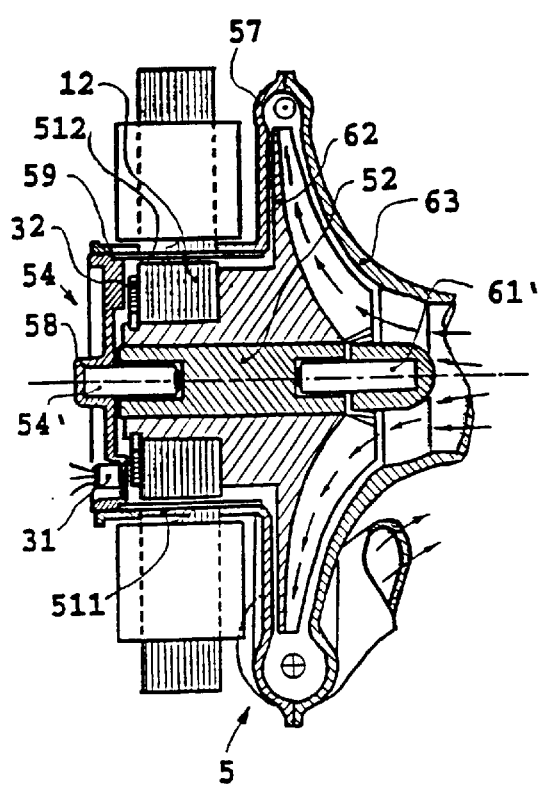

The motor and pump assembly is shown in FIG. 8.

Figure 9:
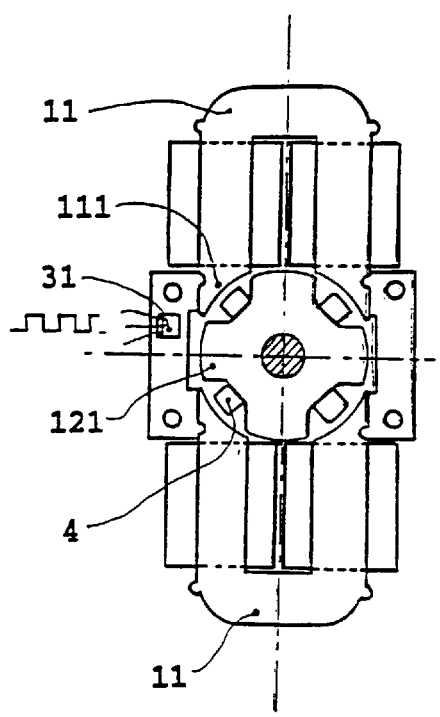

A variation of the motor is shown in FIG. 9.

Figure 10:
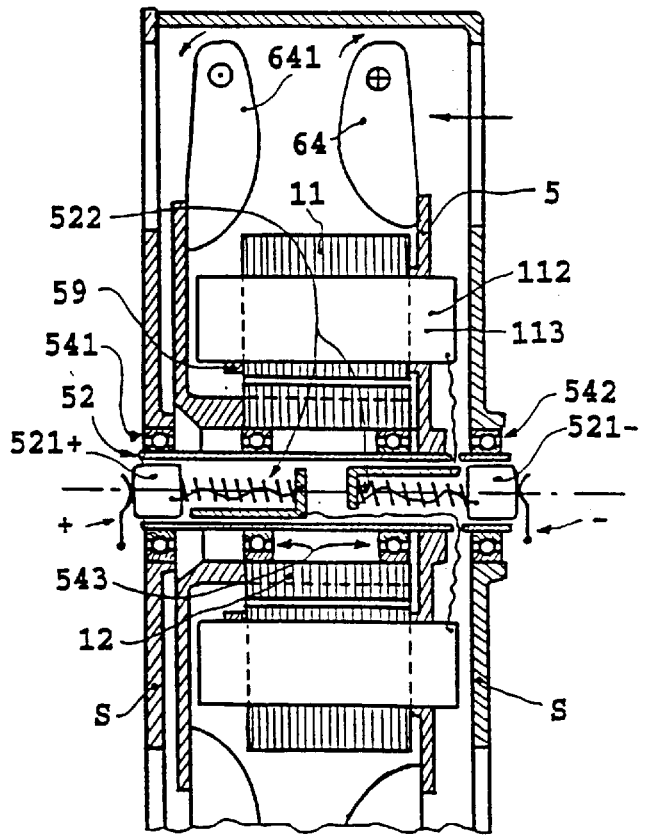

The motor and fan assembly is shown in FIG. 10.

In principle, all these compoent parts are known in many variants from the state of the art and constitute the subject matter of the invention only to the extent in in which, by useful combinations, they interact with the magnetomotive circuit (iron yokes and windings), which possesses important novelty features. The driving magnetic circuit is characterized in that, on the side of the wound magnetic yokes (and as far as possible on the side of the rotor), magnetic paths (understood in the form of lines of force of the magnetic force) are employed, which are as short as possible. At least 50% of the length of the magnetic circuit of the wound yokes are located within the windings passed through by current, thus positively contributing to the development of the driving magnetic flux. In the most favourable case it may happen that the windings comprise up to 90% of the length of the yokes 11. The wound yoke (or yokes) is (are) disposed symmetrically opposite the rotor so that no radial magnetic forces are generated, but torques.

The FIG. 1 shows an overall view of a motor according to the invention as a non-restrictive embodiment example. The magnetic motor circuit is comprised of two horizontal U-shaped magnetic yokes 11X and two vertical magnetic yokes 11Y, in which case the four yokes are identical. Each yoke possesses two poles 111 esch, which are directed to the rotor and which assume the north or the south polarity when a current passes through the main windings 112 or through the secondary windings 113.

Consequently, there are eight poles constituting the segments of a circumference of a circle, surrounded by which the rotor revolves axially. The same has six poles 121, which are separated by a narrow air gap from the external poles 111, which possess an area corresponding approximately to the area of the poles 111 and a width, which corresponds approximately to the opening of the two legs of the yokes 11.

As can be gathered from FIG. 1, when four rotor poles 121 are located opposite four poles 111 of the vertical yokes 111Y, then the remaining horizontal external poles 111X are located opposite the pole gaps 122 of the poles 121. The rotor poles 121 are interconnected by means of a common rotor yoke 123 so that these parts are merely formations of the lamination pack of the rotor 12, which is comprised of punched-out electromagnetic sheet metal possessing a round configuration with indentations. These parts are mounted with the aid of an elastic member 53 on the motor shaft 52. This member is e.g. fabricated from a plastic possessing elastic qualities and its purpose is to attenuate the rotor vibrations or to reduce its weight. This member 53 may be dispensed with in case the bore of the rotor laminations 12 presses direct on the motor shaft 52.

The wound yokes 11 are likewise formed of U-configured sheet metal laminations, the thickness of the laminations being selected according to the rotational motor speed (commutation frequency). The standard value both for the thickness of the laminations of the yoke 11 as well as for the thickness of the rotor laminations ranges from 0.1 mm to 1 mm, in which case the thin lamellae are suitable for high rotational speeds (50,000 rpm) and the thick lamellae are employed for rotationsl speeds of up to approximately 500–1000 rpm.

As the most inexpensive material for the wound yokes 11 and for the rotor 12, silicon laminations (for transformers) are recommended. For the wound yokes 11 it is also possible to make use of grain-oriented laminations possessing a preferred direction in the form of U-shaped punched lamellae (the preferred direction is in this case parallel to the U-configured legs) or in the form of wound, cut and ground cores (as in the case of transformers with strip-wound cut areas). However, the solution is a more expensive one. At any rate, the cross section of the yokes is rectangular, which may result in problems by winding with thicker wires (above 1 mm$^2$ cross section.

In a special embodiment, the insulating layer between the lamellae possesses elastic properties which may serve to attenuate the magnetostrictive vibrations or for the sealing of the lamination package. Onto the U-shaped yokes (preferably prefabricated), windings are slidably mounted, in which case, however, each yoke possesses at least one main winding. These windings can be executed in a normal manner with enamel-insulated wire, without a former (with self-bonding wire), see FIG. 2. In a normal wire winding, the secondary winding 113 executed with thinner wire may be located on a former 114 underneath the main winding 112. However, according to the invention, a tape winding is employed, to be more precise, of an insulated or non-insulated copper or aluminum tape. In the latter case, the main winding tape is flanked on each side with an insulating foil 115 (e.g. of ployester), which is somewhat wider than the electrically conductive tape so that short circuits between the spirally wound edges of the metallic winding tape cannot take place, see FIG. 3.

A particularly favourable solution is the simultaneous execution of the main winding 112 and of the secondary winding 113 possessing a smaller cross section. In this case the winding tapes possess an identical thickness, but a different width, are wound at an appropriate distance parallel over the identical, sufficiently wide insulating foil 115. Since in the construction of these windings techniques are used which are known from the fabrication of capacitors and transformers, we will not describe any details relating to the construction of the connections and to the strengthening of a former-less coil. Two each of the windings described in connection with the FIGS. 2 and 3 are slidably inserted over the two legs of the yokes 111, where they can be connected as required. Thus the motive magnetic circuit 1 is comprised of the wound yokes 11 with two cores 11X and 11Y each, eight main windings 112 and, possibly, eight secondary windings 113, together with the rotor 12.

When separately regarding one yoke 11 and two rotor poles 121, together with that portion of the yoke 123, which connects these poles and when the two windings 112 are passed through by currents, a magnetic flux is produced which corresponds to the dotted line in FIG. 1, so that this magnetic circuit resembles the magnetic circuit of an oscillating motor of an electric razor.

When the rotor poles 121 are not located opposite the poles 111X of the external yokes (see FIG. 1) and when the yokes 11X are stationary, as a consequence of the passage of current, the poles 111X will attract the rotor poles 12 through approximately 30°. In order to have these discrete 30° of movement become a continuous rotational motion, it is necessary that the current conduction to the yokes wound in the direction of the axes X and Y be effected in a corresponding sequence, which is coordinated by the rotor position detecting circuit 3 and, by the electronic control circuit 2, is converted into control signals of the windings.

The rotor position detection circuit 3 that is to supply the switching-off signal for the windings of the X axis or the Y axis following a rotor revolution of 30° is, according to the FIG. 4, comprised of a multipolar magnetic disk 32, which possesses six pairs of poles and is mounted on the rotor which is travelling in front of a stationary Hall sensor 31, which, for the purpose of finding an optimal working point, is adaptable in its position to the power control or to the change of rotation. When the poles of the magnetic disk 32 move consecutively in front of the Hall sensor 31 (with digital output), then a logical signal "low" or "high" appears at the output of the latter, depending upon the rotor position, see FIG. 5.

The control circuit 2 of the windings 112 and 113 is mainly comprised of two power transistors (by preference MOSFET field effect transistors) 21X,21Y, which are connected in series with the main windings 112X or 112Y and the current source located externally of the motor, see FIG. 6. The windings 112 or 113X (or Y), which are to be found in oppositely located yokes, may be connected in series or in parallel, depending upon the voltage level at which the motor is operating.

The transistors 21X and 21Y are controlled in the push-pull mode by means of a simple electronic circuit of the rotor position detecting circuit 3 so that, when the output of the Hall senspr is on "high", the transistor 21X is conductive, while the transistor 21Y is conductive when the output of the Hall sensor 31 indicates "low". The horizontally wound yoke 11X or the vertical yokes 11Y are also magnetized consecutively so that a rotary field appears at the poles 111 which sets the rotor in motion.

The positive voltage at the junction between the drain of the transistors 21X,21Y and the windings 112X and 112Y (as compared with 0=minus) is depicted in FIG. 7 by means of a continuous line. The current, which passes through the main windings 112 possesses, on account of the effect of the inductivity, the course of the dotted line of FIG. 7. Consequently, in the initial phase, the current rises slowly and in a similar fashion also the effective driving magnetic flux. When the winding is disconnected, a substantial voltage Ua is produced within the same, which higher than Un=motor nominal voltage, which constitutes a lost energy and can lead to a destruction of the transistors 21. This self-induction voltage Ua can be converted into a useful motive effect if it is supplied to the winding that is about to be switched on.

Figure 6A:
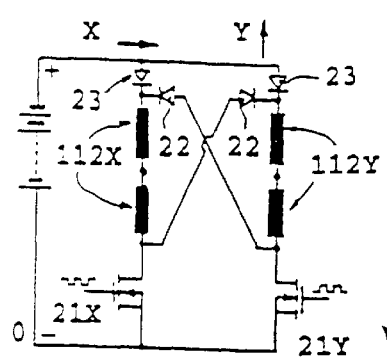
Figure 6D:
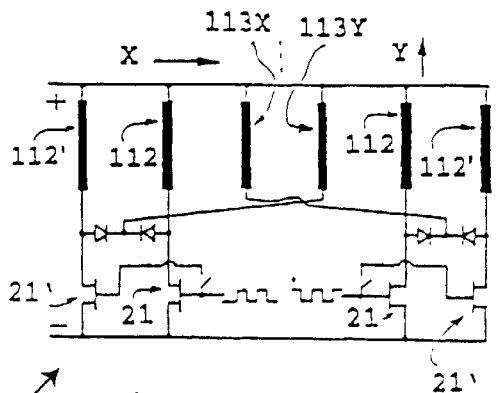
Figure 6B:
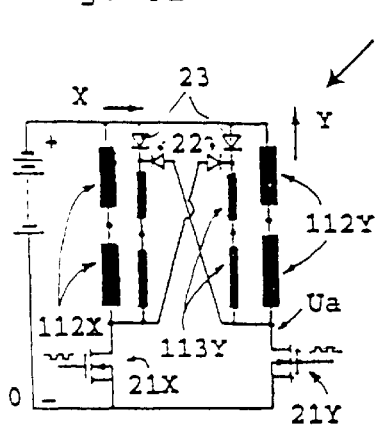

As becomes apparent from FIG. 6a, this has to be done with the aid of the coupling diodes 22, which supply a positive overvoltage, which is generated when the winding 112X is switched off, to the winding 112Y (or vice versa). The decoupling diodes 23 prevent the self-induction voltage Ua from being supplied to the plus connection of the voltage source. However, this circuit is subject to the disadvantage that the closing of the electric circuit of the self-induction voltage Ua is effected by the transistors 21 or via the current source. It is possible to avoid this disadvantage by the employment of secondary windings which are located on the same yokes 11, see FIG. 6b. The self-induction voltage Ua developed in the main winding 112X (as source) and is supplied to the secondary windings 113Y of the vertical yokes as receiver. Consequently, with the aid of the self-induction overvoltage Ua from there main winding 112X, a useful current is produced in the secondary windings 113Y, thus a magnetic flux in the yokes 11Y, upon which the same are wound. Simultaneously with the production of the current by the secondary winding 113Y, also the nominal voltage UN is supplied to the main winding 112Y because, simultaneously with the blocking of the transistor 21X, the transistor 21Y becomes conductive. The effect of the rapidly rising transient current in the secondary winding 113Y, which rises fairly fast and ths effect of the longer-lasting, but more slowly rising current through the main windings 112Y are added, which results in a faster increase of the magnetic flux through the vertical yokes, thus in an increase in the driving effect. The rotor 12 is, by means of the repetition of the above-described actions, set in a continuous rotational motion so that the same executes a complete revolution when each pair of yokes receives six control pulses. The optimization of the switching point can be practically effected by the displacement of the Hall sensor 31 relative to the yokes 11.

The magnetic and electric components of the motor can be secured in an accommodation frame 5 which is fabricated from plastic material or diecast from a suitable nonmagnetic metal, see FIGS. 1 and 8. This frame can be executed in widely differing models, however, it possesses mainly recesses wherein the yokes 11 and the bearing 54 of the motor shaft are mounted.

On this frame 5, which serves as a cooler, it is possible to likewise attach as per usual the power transistors 21, the diodes 22 and 23 as well as other mechanical and elecrtical components (baseplate, Hall sensor, etc.). The higher voltage which is required for the gate triggering of the power transistors 21, can be gained by the integration of the peaks of the self-induction voltage Ua.

Figure 1A:
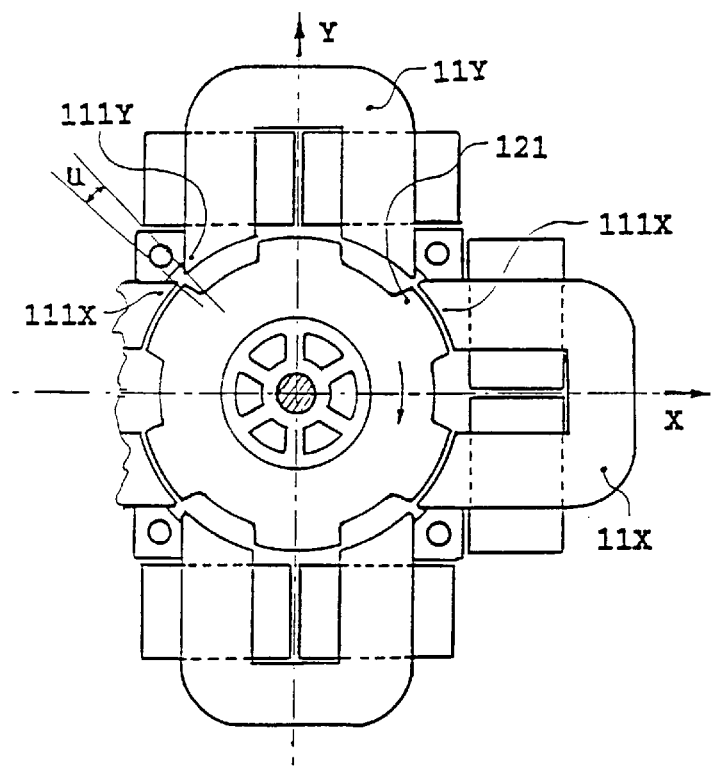

In order to provide a better understanding we will commence with the FIG. 1a, which is an enlarged detail of the FIG. 1. The FIGS. 1 and 1a are to be regarded in connection with the FIG. 6c, which is an improvement and detail of the FIG. 6b.

According to the FIG. 1, when four rotor poles coincide approximately with the poles 111Y, their associated main windings 112Y are disconnected, which leads immediately to the appearance of the high self-induction voltage Ua, which is transmitted to the secondary windings 113X, while the main windings 112X are supplied from the current source. The four poles 111X allocated to these windings are magnetized rather rapidly and are thereby capable of attracting the four rotor poles 121 which are just moving away from the two relevant poles of the switched-off yokes 11Y. The precondition for this to take place is that the acutely angled extermities of the poles 111X are located in the proximity of the corresponding extremities of the poles 111Y since otherwise the magnetization of the poles 111X of the horizontal yokes is incapable of exercising an attraction effect on the rotor poles in good time so that the current in the windings 112X,113X would rise steeply, but without any useful effect.

In order to illustrate the importance of these facts, in the FIG. 1a, the distance regarded as angle "u" between the external corners of the poles 111X and 111Y was reduced in comparison with the one depicted in the FIG. 1. This distance has to be optimized depending on the electromechanical parameters of the respective motors and it is at least 3 to 4 times larger than the air gap between the yokes 11 and the rotor 12 in order to avoid the occurrence of magnetic losses due to the direct contact between the yokes 11X and 11Y, The reciprocal attachment of the yokes 11 as well as the connection of the motor to a fixed support is preferably effected within this area between the windings and the rotor, where a low level of vibration was noted.

Figure 6C:
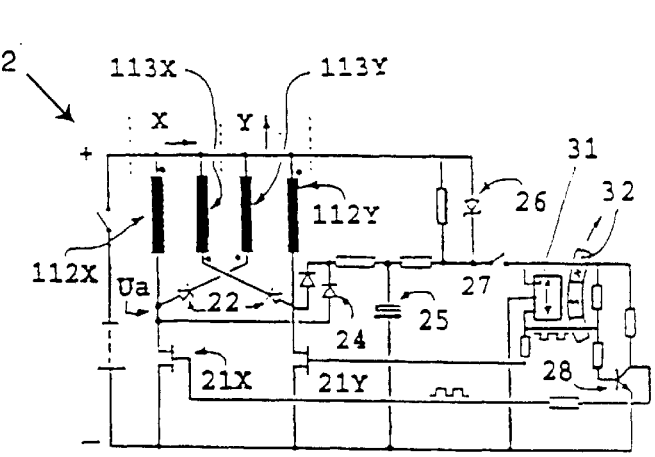
Figure 6E:
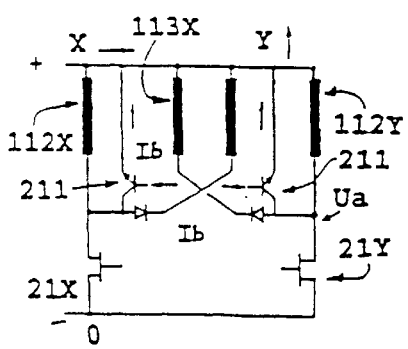

The FIG. 6c illustrates the complete circuit diagram of an operative motor, in which the dots next to the windings 112 and 113 designate their beginnings and 112X illustrates e.g. the four main windings of the yokes 11X that can be connected in series or in parallel.

Here, merely two coupling diodes 22 are required which conduct the self-induction voltage Ua further to the beginnings of the secondary windings 113. The diodes 24 conduct the voltage peaks Ua to the capacitor 25 which, subsequent to the starting of the motor, is charged with a voltage which is higher than the supply voltage U-bat and which ensure the supply of the control circuit of the gate electrodes of the transistors 21Y,21X. This voltage is restricted by the Zener diode 26. When the switch 27 is closed, the Hall sensor 31 is energized and, at the digital output of the latter which is connected to the gate electrode of the transistors 21Y, the logical signal "high" or "low" appears, depending on whether a north pole or south pole of the multipolar magnetic disk 32 is to be found in front of the Hall sensor 31. This logical signal is also applied to the signal inversion transistor 28, which applies the "low" signal to the gate electrode of the transistor 21X when the signal "high" is apparent at the gate electrode of the transistor 21Y. The arrow above the Hall sensor 31 indicates that the same is movable in relation to its support so that it is possible to thereby alter the phase of the logical signals being generated when the multipolar magnetic disk 32 is rotated. The control of the rotational speed of the motor can also be effected without changing the phase of the control signals by means of a change in the supply voltage. It is also possible to effect the change in the rotational speed by changing the resistance of the transistors 21, thus by controlling the gate voltage. However, this control is disadvantageous because it causes ohmic losses, strains the transistors and should therefore be used solely for low outputs. A two-step control may be effected by increasing the ohmic resistance of the motor, e.g. by the separation of one half of the parallelly connected windings, see FIG. 6d. The windings 112,112' connected in parallel via the transistors 21,21' are simultaneously controlled when the full output is demanded of the motor. If an output reduction is desired, in that case the transistors 21' are no longer triggered and the winding 112' remains inoperative. Hence the motor operates with higher lossess and with a reduced output. A more advantageous variant of the more extensive output control is shown in principle following FIG. 6c.

Two further semiconductor modules (here bipolar transistors) are added to the control circuit of the motor which play the part of a free-wheeling diode, which return the self-induction voltage of the winding which has generated the same, but which are controllable this time. The FIG. 5b shows, independently of the rotor angle of rotation, the control signals of the transistors 21 and the transistors 211, which return the self-induction voltage Ua. On the abscissa of FIG. 5b, the output signal of the Hall sensor is illustrated, which corresponds to a rotor angle of 30° and which has the same duration as the current pulse which is applied to the base of the transistors 211Y. The duration of the positive voltage pulses being applied to the MOFSET transistors 21Y for the output control is illustrated in two variants on the lower abscissa, where this duration reaches 30° only at full load. In the first variant A, the transistors 21 and 211 become conductive simultaneously and this when the logical signal at the output of the Hall sensor changes from "low" to "high". At partial load the transistor 21Y blocks before the Hall sensor switches once more to the logical signal "low", thus before the rotor performs a 300 rotation. The blocking of the transistor 21 can e.g. be brought about by reaching a limit value of the current or of the rotational speed (the commutation frequency). When this happens, the self-induction voltage Ua is not supplied immediately to the secondary winding 113X because the transistor 211Y conducts this voltage to the plus connection of the supply voltage U-bat. The demagnetization of the yokes 11Y, which continues to attract the rotor poles 121 is curbed thereby. When the rotor angle of rotation of 30° is reached, i.e. when the base current of the transistors 211Y stops and the output of the Hall sensor 31 assumes the logical level "low", the passage of the residual current through the transistor 211Y ceases and the self-induction voltage Ua is supplied to the secondary winding 113X. In a similar manner, but with a rotor angle offset through 30° (e.g. 30–60° instead of 0–30°), what happened with the Y axis is repeated with regard to the horizontal yokes 11X, the transistors 21X and 211X thus become conductive because the logical signal at the output of the Hall sensor became "low" instead of "high". Consequently, by means of this type of control, the control of the transistors 21X, 211X is achieved in a rotor angle-dependent manner with a variable angle reaching maximally 30°, thus not a fixed 30° aperture angle as in the uncontrolled motors.

By means of this variation of the opening time of the transistors 21, the energy supply, thus the motor output, is controlled. According to the variant B depicted in the FIG. 5b, a similar effect is achieved by the repeated current conduction of the transistors 21X,21Y within a rotor angle of 30°. This is achieved by a pulse width modulation (L=pulse, l=interval) with an appropriate frequency of the control signals of the transistors 21. The current conduction times of the transistor 21Y are illustrated with a boldly drawn line and those of the transistor 21X with a dashed line. It is advantageous to integrate all electronic component parts of the motor as far as possible on ay single circuit board. The mounting of the yokes 11 visible in the FIGS. 1 and 8 is (on account of the narrow air gap between rotor and wound yoke) important and exacting. As becomes apparent here, the yokes 11 possess on both sides (if possible, at two different distances from the shaft) recesses or semicircular elevated portions 116 which, by means of suitable counterpieces 55, can be matchingly (vertically to the plane of the drawing) inserted. These counterpieces constitute a negative form of the recesses 116 mentioned in the foregoing and are an integral part of the attachment pieces 56 which are to be found mounted on a baseplate 57.

The yokes are therefore attached positively and radially, which ensures a uniform distance relative to the rotor 12 (a constant air gap). The bearing cover 58 with the counter-bearing 54', which are attached both axially as well as radially to the frame 5, retain the yokes 11 in position so that the same are incapable of being axially displaced.—With these component parts the motor is operative.

Mode of Operation

When the motor is connected to a current source possessing the voltage Un, then the electronic circuit 2 will apply a control voltage to the gate electrode of one of the transistors 21, e.g. to 21Y, because a signal level "high" or "low" will exist at the output of the Hall sensor 31. The main winding 112Y is energized and moves the rotor 12 from the initial position illustrated in the FIG. 1 through a rotation of 30° to a position in which the poles 111X–121 coincide. Consequently, from the relative position of the poles in relation to the Y axis it comes to a similar position, but this in relation to the X axis. Before this position is reached, the rotor position detector 3 changes the logical level at the output of the Hall sensor 31 so that the transistor 21X becomes conductive, whereas the transistor 21Y blocks. The operations already described are repeated and the rotor revolves continuously and executes a full revolution relative to the wound yokes 11 after each of these pairs (X and Y) has received six current pulses. The stopping or the starting of the motor can be achieved in that the gate connections of the transistors 21 are connected to negative wire without separating the motor from the voltage source. In a digital Hall sensor 31, the change of the logical,output signal always takes place at the same relative angle of the rotor poles 21 in relation to the poles 111 of the yokes 11, this position being designated as angle 0. It may be necessary in the interest of the output or rotationsl speed control to change this angle e.g. by +/−5°. This can be achieved by the mechanical change in the position of the Hall sensor ot by influencing its switching point with the aid of an external magnetic field, which alters the changing magnetic field of the multipolar disk 32 (by means of a phase shift).

If an analog Hall sensor is employed, in that case a sinusoidal signal is generated at the output of the latter in lieu of the square-wave signal as per FIG. 5. The change-over point can in this case be changed randomly relative to zero when any point whatever of the curve of sines is selected as switching voltage level for triggering the commutation.

As mentioned in the foregoing, also this curve of sines can be phase-shifted so that in this case two possibilities exist for influencing the angle of commutation. The influencing of the magnetic field mentioned can be practically achieved with the aid of a winding or of a permanent magnet, which are fitted within the proximity of the Hall sensor, in which case a current passes through the winding which is almost constant. The change in rotation can be brought about by changing the logical signal of FIG. 5 so that the transistor 21X becomes conductive when the logical signal of the Hall sensor is "high" instead of "low", or by the changing over to another Hall sensor which, in comparison with the former, is angularly displaced.

The brushless motor variants illustrated here are capable of operating immersed in a liquid, e.g. a fuel, if the electrical parts are protected, by way of example, embedded in a synthetic resin. It is also possible to realize with these motors simple pumps devoid of any air gap sealing, in which case the entire motor is accommodated in a pressurized pump housing. This type of motor is particularly suitable for driving fans and pumps, more especially for those wherein the rotor of the motor as well as that of the pump rotate in solidarity with a liquid, see FIG. 8. In this case it is necessary for the rotor chamber to be sealed relative to the windings or the outer space. The chief problem here is the sealing of the cylindrical air gap space because the radial dimesion of the latter is in the order of magnitude of 0.1 mm.

This problem is resolved along the lines of the invention with the aid of a thin, cylindrical shell of nonmagnetic material (plastic or polymer applied in the liquid state), or special special steel possessing special electrical and magnetic properties, are e.g. known from the air gap pipes of the wet-running asynchronous motor pumps. This cylindrical member would not be able to withstand the pressure on its own; but it is supported upon the external poles 111 or upon segments of filling material 511, which are to be found between said poles. In this manner the pressure merely acts on areas of the cylindrical shell 512, which are not larger than a few 0.1 mm and which correspond to the spaces between the poles 111 and the segments 511. When subjected to pressure in such small areas, even a thin foil (0.1 mm) is able to resist pressures of some tens of bars.

An assembly of motor and pump along the lines of the invention can, as per FIG. 8, be executed as detailed below.

The yokes 11 are mounted from the outside (from the left) on the frame 5 (fabricated from plastic or metal) and fitted through the retaining ring or retaining cover 59. The previously mentioned interspaces of the cylindrical rotor chamber are sealed e.g. with a polymer varnish, an epoxy resin, etc. The rotor 12 with the multipolar magnetic disk 32 secured to the left-hand side is, together with the pump rotor 62 which engages lockingly into the rotor 12, mounted on the motor shaft; the motor shaft 12 must also not transmit the useful motor torque. The assembly is closed with the pump cover 63, which also centers the bearing bolt 61'. The known constructional details of a pump are not discussed here, merely the direction of flow of the pumped liquid is indicated by means of arrows. The Hall sensor 31 is located in the (dry) outer space of the pump and is separated by a thin, pressure-proof and magnetic field-pervious wall from the magnetic disk 32, which is located in the "wet" space.

The motor or pump shaft 52 is e.g. fabricated from a ceramic pipe, in which bores are provided for the bearing bolts 54' and 61'. The reduction of the noise generation is one of the main problems of the ventilators and blowers and the noise is sometimes produced by virtue of the torque fluctuations that are transmitted to the support. In order to eliminate this disadvantage it is possible according to the invention to realize a special variant of a motor blower possessing two rotors revolving in opposite directions so that the motor possesses no fixed components that are capable of transmitting vibrations to a support which are to be put down to the torque. According to the FIG. 10, the yokes 11 with the windings 112,113, together with the associated electronic component parts, are mounted on a support 5, in which case the support is also connected to a rotary shaft 52 which preferably possesses an axial bore. Fan blades 64 are likewise fixed to this support, which convey the air from the right to the left when the support 5 rotates to the right. At the ends of the shaft 52, bearings 541 or 542 are provided. on the left-hand side, the yokes are this time in comparison with the support 5, not mounted on a bearing cover, but on a retaining ring 59, through which the rotor 12 is passed. The rotor 12 carries fan blades 641, which convey the air from the right to the left when the rotor turns to the left. The rotor revolves freely on the shaft 52 with the aid of the bearings 543 without becoming axially displaced. in the interior of the shaft 52, within an insulating tube, two reciprocally insulated brishes 521+, 521− connected to motor leads 52 are accommodated, which are urge outwardly by springs 522. These brushes touch two fixed leads +, −, which are connected to the current source Ubat, which transmit this voltage on to the rotating brushes 521+, 521−. The bearings 541 and 542 are mounted in a support S.

Mode of Operation

When the motor receives current, both the rotor 12 provided with fan blades 641 as well as the external rotor assembly with yoke 11, support 5 and blades 64 start in opposite directions of rotation (the roror to the left, the external rotor assembly to the right) and move at rotational speeds +v, −v so that the absolute rotational speed between rotor and external rotor assembly is 2 v. The rotational speed of the two counterrotating parts will increase until the resistance with which the ait opposes the blades 64,641 which are mounted on the two rotors is exactly as great as the motor torque. This blower with the two counterrotating rotors has the advantage of acting in the form of a two-step blower with a relatively low rotational speed, thus with a low noise level. However, for the motor, the design rotational speed (the relative rotational speed) between the two counterrotating parts) will be 2 v. In comparison with a conventional single-stage blower with the same output the advantages are manifest:

No reaction torques, thus no rotational vibrations, are transmitted to the support S;

the motor is designed for a double rotational speed with the same output and becomes significantly smaller and lighter thereby.

With the aid of this principle it is possible to construct, in lieu of an axial blower, counterrotating blowers with radial fans so that the axial forces are compensated in this case. If one strives for the output control with these motors, in that case it will be necessary to act from the outside on the transistors 21 rotating together with the external rotor assembly 11, 5. This is possible by means of suitable electronics known from the state of the art which, from the outside, devoid of a galvanic connection, e.g. in a magnetic fashion, with the aid of a transmitting winding and a receiver, or in an optical manner, receives control signals. Thiy type of motor (or type of pump) with the simple operating principle that is based upon the successive attraction of the rotor poles by electromagnetic poles, can also be executed with a differing number of yokes, e.g. six or eight instead of four, with the corresponding increase in the number of the rotor poles. It can also be executed in a polyphase manner, e.g. with three phases R, S, T, which are equidistantly disposed, thus at an electrical angle of 120° in lieu of 180° as hitherto.

When the rotor poles or the electromagnetic poles are expediently adapted, it is also possible to employ "U"-type yokes, whose legs are arranged axially instead of tengentially. In this motor it is also possible to dispense with the rotor position detecting sensor; this does however mean that one has to employ a somewhat complicated electronic starting and operating program, in accordance with the following principle:

Prior to the starting of the motor, electric signals are supplied into the windings which are changed independently of the winding inductivity, in which case the former depends upon the rotor position because the same causes the reluctance (inductivity) of the magnetic circuits of the affected yokes.

An electronic logic compares these modified signals and determines the rotor position therefrom so that, at the output of this circuit, a control signal of the transistor 21X or 21Y appears.

The windings which are disposed in series with the conductive transistor, are triggered and set the rotor in motion, which is magnetized by influence.

When the thusly magnetized rotor poles approach the de-energized poles, a voltage is induced into the same which is evaluated by a circuit which supplies the nominal voltage to this winding (phase) so that the rotor continues to be attracted. These operations are repeated so that the rotor revolves as if it were controlled by a rotor position detection sensor.

Once the starting of the motor has taken place, also other automatic control possibilities exist for the commutation, such as e.g. the disconnection of a winding when the current passing through the same exceeds a maximal or predetermined value; when such a value is reached in the course of the normal motor operation, this means that the rotor poles 121 have already been attracted by the poles 111, which form part of this winding.

The disconnection of a winding (e.g. 112X) results, via the electronic logic, in the switching on (possibly after a predetermined delay) of the following winding, e.g. 112Y. The interlinked cyclic control of the yoke pairs X-Y, Y-X, or R-S-T, R-S-T . . . if three (or more) phases exist, can also be controlled by means of rotor position detecting sensors or, in dependence of a motor parameter (current, induced voltage). This cyclic control can in some cases be enforced from the outside, in which case the motor operates at a rotational speed predetermined from the outside. In this case the transistors 21X,21Y are controlled by signals which come from a generator external to the motor. For this type of control the use of an asynchronous rotor (squirrel-cage rotor) in lieu of the rotor described in FIG. 1 can be of advantage. When bearing in mind the same electromagnetic criteria, this type of motor can also be executed with yokes which are located in the interior of a cup-shaped rotor.

A simpler variant of a motor along the lines of the invention is illustrated in FIG. 9. This motor possesses only two oppositely located, wound yokes 11 and a single power transistor 21, which is disposed in series with the windings of these yokes and merely four rotor poles 121. The electric circuit corresponds to FIG. 6a, however without possessing the component parts of the axis "X" (yokes 11X, winding 112X, transistor 21X). The diodes 22 and 23 arew not necessary. The rotor of this motor possesses two or four rotor positioning magnets 4, which move the same into the starting position, which corresponds to the current conduction phase of the transistor 21 or to the rotor position in which the rotor poles 121 do not coincide with the poles 111 of the yokes 11. These magnets can, for the purpose of detecting the rotor position, also trigger the Hall sensor 31 and possess small dimensions and, for that reason, exert forces which, in comparison with the electromagnetic force acting upon the rotor 12, are insignificant.

Mode of Operation

Since the positioning magnets 4 are attracted underneath the poles of the yokes 11, the rotor assumes the position mentioned in the preceding paragraph. The transistor 21 becomes conductive, the poles 111 of the yokes 11 are magnetized and attract the rotor poles 121 located closest. When the rotor poles 121 almost coincide with the external poles 111, one of the magnets 4 will move past in front of the Hall sensor 31 and change the logical state of the same, so that the windings become de-energized. The rotor continues to move under the influence of inertia until it comes to a relative position of the rotor poles 121 in relation to the poles of the yokes 11, which corresponds to the initial position. On the way to this position, another magnet 4 will move past in front of the Hall sensor 31 and change the logical state of the same so that the described operations are repeated and the motor operates. If matters are simplified further, in that case a motor can be constructed similar to the one depicted in FIG. 9, but which possesses only one wound U-type yoke which, between the extended U-type legs, comprises circular segments which act as poles 111, between which a rotor 121 possessing but two poles is revolving, while the latter is intermittently actuated twice per rotor revolution with useful torque angles of approximately 90°, which correspond to two current pulses. Especially with motors for higher voltage levels it is possible to employ, instead of the MOFSET transistors 21, also other semiconductors such as thyristors (possibly those which can be disconnected above the gate, thus GTO), bipolar transistors, etc., while adapting the electronic control circuit 2 as is known from the state of the art.

What is claimed is:

1. Electronically switched reluctance motor with wound yokes (11) magnetically separated from each other for the generation of a pulsating magnetic field and with a rotor (12) that is rotatable in relation to the yokes (11) with the rotor poles (121) which are attractable by the poles (111) of the yokes, in which case this atraction in dependence of the position of the rotor poles (121) relative to the poles (111) of the wound yokes (11) is electronically controllable, while at least one winding (112) of a yoke (11) is switchable by means of a power semiconductor (21) in series with a d.c. voltage source and the power conductor (21) is controllable in dependence of the position of the rotor poles (121) relative to the poles (111) of the yokes (11), the poles (111) of the wound yokes (11) as well as those of the rotor (121) are disposed in pairs and diametrically symmetrical relative to the rotating shaft (52) of the motor and wherein, between the rotor poles (121) of the rotor (12), non-magnetic gaps (122) exist and the rotor poles (121) are connected by a yoke (123), characterized in that the yokes (11) are U-shaped and the number of U-shaped yokes (11) is four, the yokes (11) carry windings (112), which, on a circular circumference, form eight magnetic poles (111), the number of the rotor poles (121) of the rotor (12) is six and the distance between the external corners of the poles (111X,111Y) of adjacent yokes within the region of the air gap is smaller than the distance between the internal corners of the two poles of a yoke (11) within the region of the air gap.

2. Motor according to claim 1, characterized in that it is an electronically commutated two phase (X, Y) motor.

3. Motor according to claim 1, characterized in that the distance between the external corners of the poles (111X, 111Y) of adjacent yokes (11) within the region of the air gap is selected to be small that it is optimized with regard to the magnetic losses, while the distance is at least three times as large as the air gap.

4. Motor according to claim 1, characterized in that the yokes (11X, 11Y), within the region between the windings (112) and the rotor (12) are reciprocally attached so as to be disposed in a radial arrangement.

5. Motor according to claim 1, characterized in that the yokes (11) are provided with recessed or elevated points (116) which engage into corresponding recessed or raised points in counterparts (55) disposed between the windings (112) and the rotor (12) for the positive attachment of the yokes (111).

6. Motor according to claim 5, characterized in that the counterparts (55) form component parts of mounting pieces (56) which are secured to a baseplate (57) of a rigid, non-magnetic frame (5), and in that the magnetically acting parts (11,12) of the frame are positioned relative to each other with the aid of the frame (5).

7. Motor according to claim 1, characterized in that it possesses windings (112, 113) which are fabricated from at least one spirally wound metallic tape, while the windings are insulated from one another by an insulating sheeting or by means of an insulating layer applied to the tape.

8. Motor according to claim 7, characterized in that the same possesses at least one main winding (112) with a secondary winding (113), said windings being comprised of metallic tapes and are wound at a distance next to each other and parallel to each other.

9. Motor according to claim 1, characterized in that the same possesses a multipolar magnetic disk (32) secured to the rotor (12) and only one Hall sensor (31) having a digital or analog output, in front of which the magnetic disk (32) is rotatable relative to the motor windings for controlling the current supply.

10. Motor according to claim 1, characterized in that a digital output of a rotor position detecting sensor (31) triggers direct the gate electrode of a power semiconductor (21Y) for selecting a winding and triggers indirect, by means of a switching semiconductor (28) supplying the complementary logical state, another power semiconductor (21Y) for another winding.

11. Motor according to claim 1, characterized in that the power or speed control can be effected with the aid of a phase shift of the triggering signals from power semiconductors (21) for triggering the windings (112), whereas the phase shift can be effected with the aid of a local displacement of the position of a hall sensor (31) or by means of the action of a magnetic field.

12. Motor according to claim 1, characterized in that the direction of rotation of the motor can be effected with the aid of the inversion of the logical signal of a Hall sensor (31) or with the aid of the changing over between two Hall sensors (31), that are disposed in different angular positions relative to the yokes (11).

13. Motor according to claim 1, characterized in that, with the aid of logical comparison processes of the inductivity of the magnetic circuits (1) relative to the rotor (2), the rotor position is detectable and in that this electronic information can be utilized for controlling the running or the starting of the motor for the successive triggering of power semiconductors (21) for the triggering of the windings (112).

14. Motor according to claim 1, characterized in that the control fo the semiconductors (21) for the triggering of the windings (112) takes place with the aid of an electronic circuit having a fixed program not comprising the detection of the rotor position.

15. Motor according to claim 1, characterized in that the same possesses a rotor with a squirrel cage winding.

16. Motor according to claim 1, characterized in that the same possesses a rotor chamber which is sealed to the outside with the aid of a thin shell (512) comprised of plastic, of a polymer or elastomer layer or of a metallic alloy possessing suitable magnetic or electrical properties, in which the shell is acted upon by compressive forces merely in small intermediate areas and, with the largest part of its surface area, is supported upon the external poles (111) or upon a non-magnetic filling disposed between the external poles (111).

17. Motor according to claim 1, characterized in that the rotor (12) of the motor is positively connected to the pump rotor (62) of a motor-driven pump, in which the rotor (12) of the motor and the pump rotor (62) are mounted on a shaft (52), preferably comprised of ceramic material, which is rotatable between bearings (54) so that the shaft (52) does not transmit any torque stress of the pump rotor to the rotor (12) of the motor.

18. Motor according to any of the preceding claims, characterized in that the same possesses lamellae that are secured to one another by means of an insulating adhesive agent possessing elastic properties.

19. Electronically commutated D.C. motor with at least two magnetically separated yokes (11) carrying windings (112) which are angularly disposed relative to each other in the direction of rotation of the motor, wherein the demagnetization energy which is produced when the windings (112) are disconnected, is reciprocally transmissible by the yokes (11) with the aid of coupling diodes (22), more particularly according to claim 1, characterized in that the self-induction voltage (Ua), which comes from a winding (112), can be tapped at a joint between this winding and a power semiconductor (21) for triggering the winding (112) and, by means of a coupling diode (22), can be connected direct to the beginning of a winding (112) disposed on the functionally following yoke (11).

20. Motor according to claim 19, characterized in that, in each case, not more than one power semiconductor (21) is connected in series with a winding (112).

21. Motor according to claim 19, characterized in that, the yokes (11), in addition to the windings serving (113), and in that the self-induction voltage (Ua) coming from a main winding (112), can be tapped at a joint between this main winding and a power semiconductor (21) for triggering the main winding (112) and can be conducted through diodes (22) to the beginning of a secondary winding (113) mounted upon a functionally following yoke (11).

22. Motor according to the claim 21, characterized in that the self-induction voltage (Ua) produced when a control semiconductor (21) is disconnected, during the period of time in which a rotor position sensor (31) does not change its logical state, can be returned with the aid of further, controllable semiconductors (211) to the main winding (112) wherein it originated.

23. Motor according to the claim 22, characterized in that the power semiconductors (21,211) of a phase (X,Y) become simultaneously conductive, but the blocking of the further semiconductors (211) only takes place with the change in the logical state at the output of the rotor position sensor (31).

24. Motor according to the claim 1, characterized in that the peak of the self-induction voltage (Ua) can be stored in a capacitor (25) for gaining the control voltage of a power semiconductor (21).

25. Electronically commutated motor according to claim 1, characterized in that the rotor (12) and the external rotor comprising wound yokes (11) with a support (S) and in that the rotor (12) and the external rotor are rotatable in the opposite direction for the generation of, in each case, a part of the utilizable motor output.

26. Motor according to the claim 25, characterized in that the support (S) possesses two bearings (541,542) for supporting a rotating shaft (52), while an external rotor support (5) for the external rotor (11) rotatable conjointly with the rotary shaft (52) is mounted on the rotary shaft (52) and in that the rotary shaft (52), on its extremities, possesses brushes (521+, 521−) for the transmission of the energy required by the motor.

27. Motor according to the claim 26, characterized in that the rotor is provided with fluidic displacement parts (641) and is insertable into the interior of the external rotor (11) or of the external rotor support (5) and is rotatable by means of a bearing (543) in relation to the latter.

28. Motor according to the claim 25, characterized in that both the rotor (12) as well as the external rotor (11) drive fluidic displacement parts (64,641) of a counterrotating blower or of a counterrotating pump.

29. Motor according to the claim 25, characterized in that the control of the motor output can be effected by a stationary part devoid of galvanic contact, more particularly with the aid of optoelectric means, or by the action of magnetic fields upon the electronic rotating modules of the motor.

* * * * *